Figure 1:
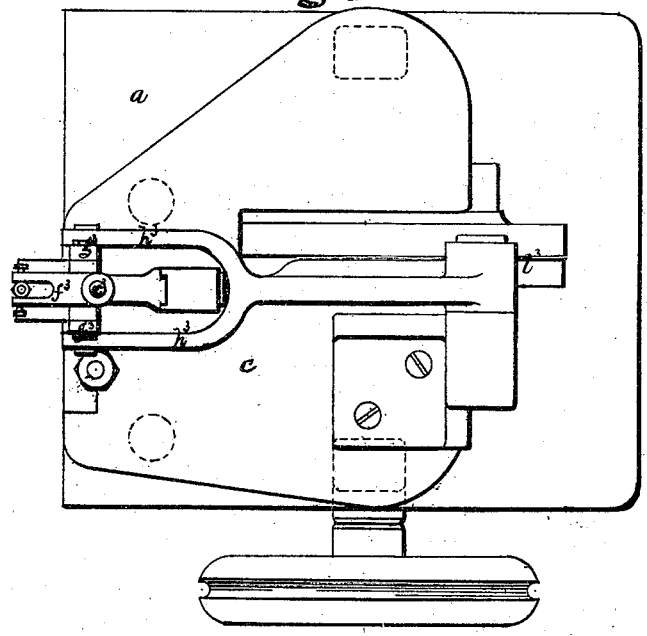

5 Sheets—Sheet 1.

G. McKAY & H. P. FAIRFIELD.
BOOT AND SHOE NAILING MACHINE.

No. 173,415. Patented Feb. 15, 1876.

Witnesses.
L. H. Latimer.
Wm Pratt.

Inventors.
Gordon McKay.
Hadley P. Fairfield.
PER Crosby & Gregory
Attys.

N. PETERS, PHOTO-LITHOGRAPHER, WASHINGTON, D.C.

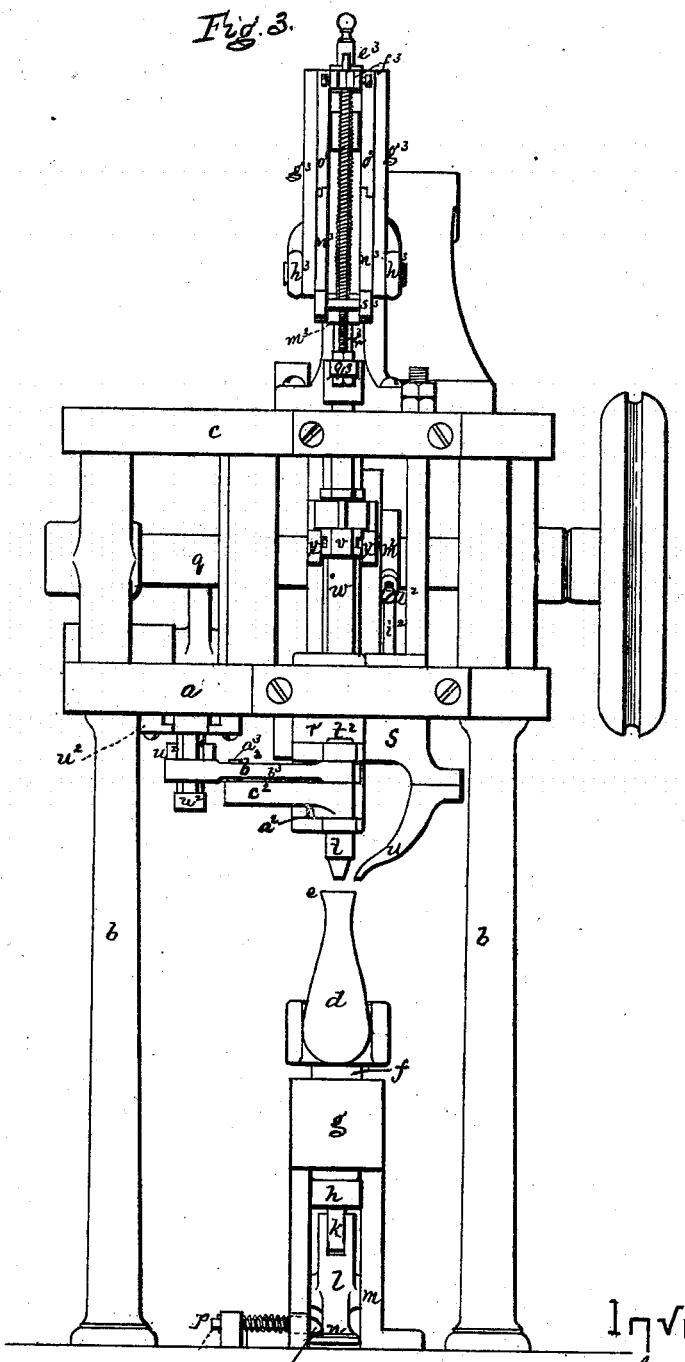

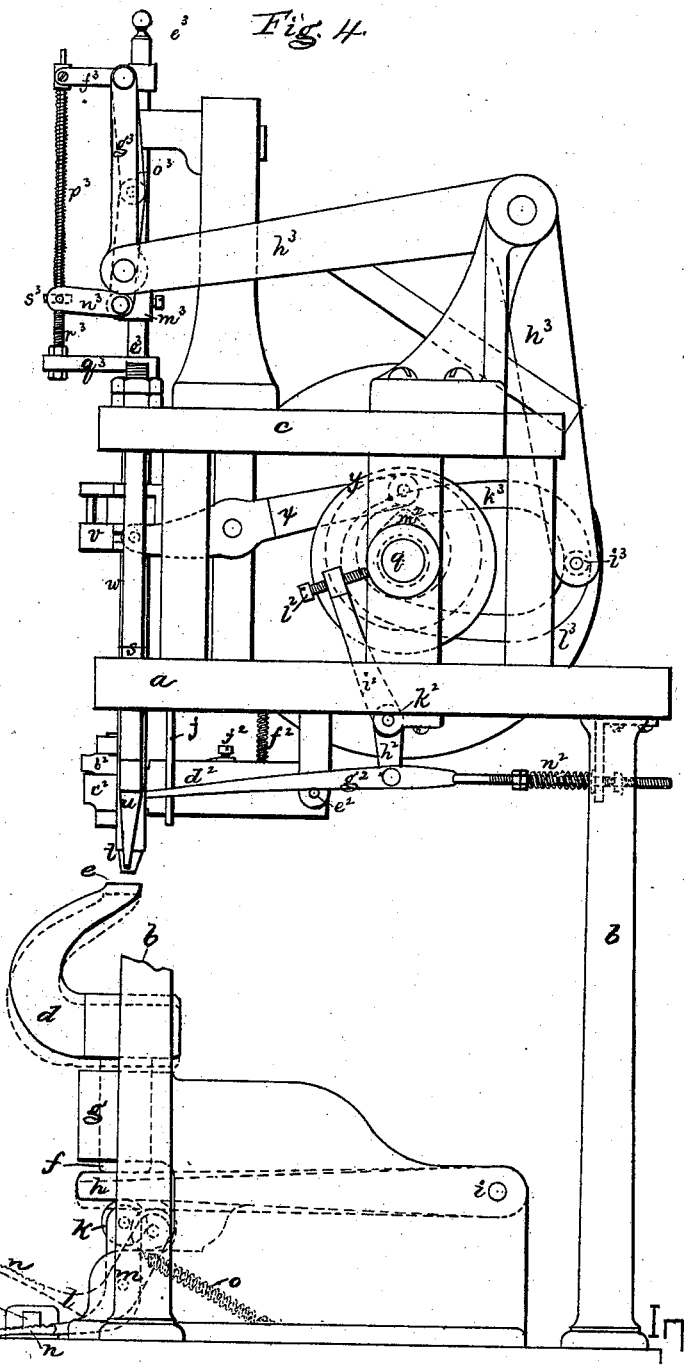

5 Sheets—Sheet 4.
G. McKAY & H. P. FAIRFIELD.
BOOT AND SHOE NAILING MACHINE.
No. 173,415. Patented Feb. 15, 1876.
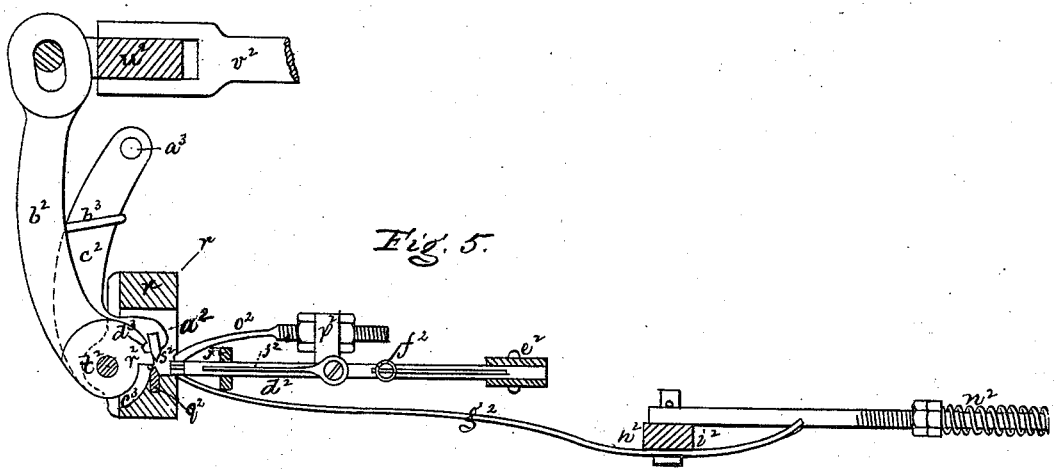
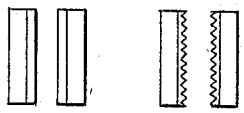
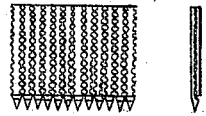
Witnesses.
L. H. Latimer.
Wm Pratt.
Inventors.
Gordon McKay
Hadley P. Fairfield.
PER Crosby & Gregory
Atty's.

G. McKAY & H. P. FAIRFIELD.
BOOT AND SHOE NAILING MACHINE.
No. 173,415. Patented Feb. 15, 1876.
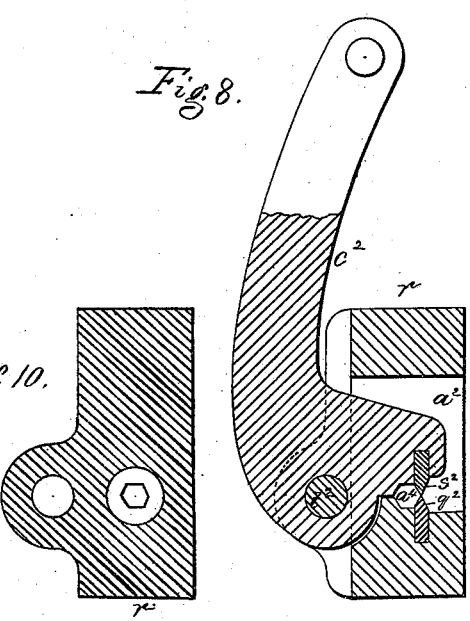
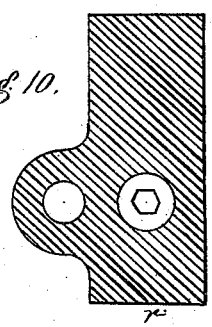
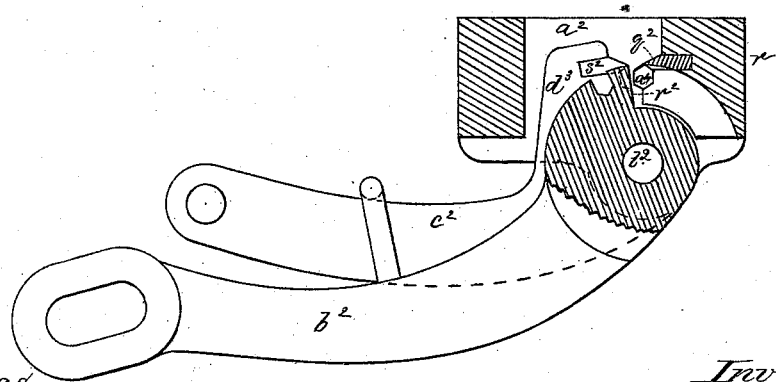

UNITED STATES PATENT OFFICE.

GORDON McKAY, OF CAMBRIDGE, AND HADLEY P. FAIRFIELD, OF BOSTON, MASSACHUSETTS.

IMPROVEMENT IN BOOT AND SHOE NAILING MACHINES.

Specification forming part of Letters Patent No. 173,415, dated February 15, 1876; application filed March 27, 1875.

*To all whom it may concern:*

Be it known that we, GORDON McKAY, of Cambridge, Middlesex county, and HADLEY P. FAIRFIELD, of Boston, Suffolk county, all in the State of Massachusetts, have invented Improvements in Machines for Uniting the Uppers and Soles of Boots and Shoes, of which the following is a specification:

The invention relates particularly to that class of machines for nailing the soles to the uppers of boots and shoes, each of which embraces in its organization a curved salient arm for supporting the shoe, like the arm or horn shown in the Blake and Libby United States Patent No. 76,150, dated March 31, 1868.

In the machine represented in the accompanying drawing and embodying our invention we show a rotative work-supporting horn, mounted in a vertical bearing and resting upon an arm, which arm rests upon the upright arm of a foot-lever, the horizontal arm of which is held down by a catch pressed forward to hold the foot-lever by a suitable spring. The upright arm of the foot-lever is drawn back by a suitable spring, and when the catch is released (which is done by foot) the latter spring releases the horn, which then drops to permit the shoe (to be nailed) to be placed and adjusted upon the horn and to release the nailed shoe. When the shoe to be nailed is placed and adjusted upon the horn the operator presses down the horizontal arm of the foot-lever by his foot, and the spring-catch then throws forward the catch to hold the lever, the lever lifting the arm that rests upon it, and the horn that rests upon the arm, and the horn bringing the shoe into position under and against the nailing mechanism. When the shoe is nailed the operator again, by foot, presses back the spring-catch, thereby releasing the foot-lever, whose spring draws it back, so as to release the arm and the horn resting upon it, the horn then dropping by gravity to permit the nailed shoe to be released and replaced by another.

It will thus be seen that by the lever, catch, and spring mechanism, the horn is automatically operated for release and replacement of the shoe, or is so operated as to leave the hands of the operator free at all times for manipulation of the shoe, this organization or arrangement constituting one feature of the invention.

Above the horn are the nail-tube, through which the nail is driven, and the feed-foot that feeds the work to be nailed, these devices being, respectively, attached to slides that move vertically through a stationary table or plate, forming part of the frame-work of the machine, this plate and an upper stationary plate above it constituting the housing-plates of the machine.

The shoe-feeding apparatus is or may be constructed and operated substantially as is shown in the McKay and Mathies Patent No. 36,163, and in the Blake and Libby Patent No. 76,150, and need not be herein particularly described.

The horn is in fixed position as to height during the nailing operation, and the nail-tube and the presser-foot are made to vary in vertical position in accordance with any variation in the thickness of stock between them (and on which they rest) and the top of the horn, in the same or substantially the same manner, or by the same or substantially the same means, as is shown in the Blake and Libby patent, already referred to, the tube and feed-foot having a lifting motion just after the nail is driven and before the feed takes place, thus relieving the pressure of the shoe upon the horn, allowing it to feed easily, and permitting a thicker portion of the sole to be brought under the nail-tube. The mechanism by which this lift of the nail-tube and feed apparatus is produced may consist of a ratchet-nut, a six-threaded screw, pawls, presser-spring, ratchet-nut box, lever, and cam, and the cam-lever and rods and springs for tripping the pawls, described in the Blake and Libby patent, and also in the aforesaid McKay and Mathies patent, reference to which may be had for a specific description of this mechanism.

In this machine we prefer to employ, instead of a wire to form the nails, a nail-strip or long ribbon-like plate, and this strip we prefer to make like the ribbed or corrugated strip described in a patent issued to Lyman R. Blake and Gordon McKay, January 26, 1875, No. 159,015. Over the nail-tube, and within the slide of which it forms a part, or to which it is fixed, is a slot or chamber, into which enters a horizontal, or approximately horizontal, trough or box, for holding the nail-strip, and presenting it to the action of a cutting mechanism, that also enters one side of said chamber; the nail-strip trough, nail-tube slide, and nail-severing mechanism being so arranged and combined that each nail severed from the strip shall be of a length corresponding to, or bearing a fixed relation to, the thickness of parts to be united by it.

The invention consists in the general arrangement or combination of parts by which nails, automatically made to correspond to the varying thickness of parts to be united by them, are cut from a metallic nail-strip or ribbon, and in general and specific details of construction and arrangement used for such purpose.

The drawing represents a nailing-machine embodying the mechanism or parts of mechanism to which our invention directly appertains.

Figure 2:
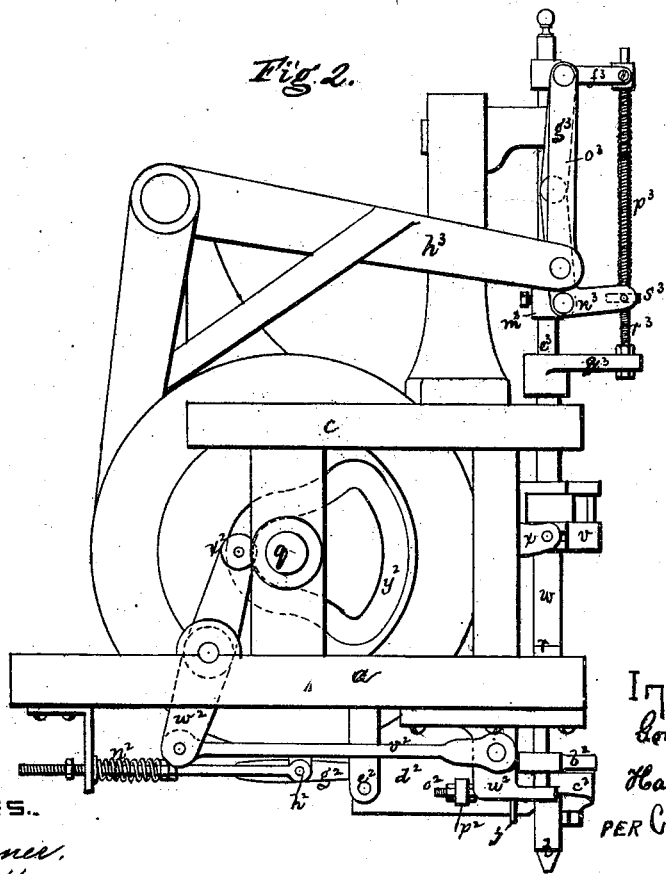

Figure 1 shows the machine in plan. Fig. 2 is a side elevation of the upper part thereof. Fig. 3 is a front elevation. Fig. 4 is a side elevation of the machine. Fig. 5 shows a sectional plan of the nail-plate-presenting and nail-cutting mechanism. Fig. 6 shows the nail-plate. Fig. 7 shows the cutters. Fig. 8 is an enlarged top view of the cutters for severing the nail from the strip; Fig. 9, an enlarged view of the severing-cutters and the cutter for cutting off the edge of the strip to form a nail of the proper length; and Fig. 10 is a view of the plate to which the nail-tube is attached.

$a$ denotes the main pillar-plate of the machine, mounted upon a suitable post or posts, $b$, and having extended up from it pillars or posts, upon which is mounted the upper plate $c$. $d$ denotes the horn or work-support, said horn being curved or inclined, and having a horizontal top face, $e$, upon which directly rests the inner surface of the inner sole of the shoe, the upper, inner sole, and outer sole of which are to be united by the metal fastenings. From the bottom of the horn extends a vertical shank-piece, $f$, that passes through a stationary bearing, $g$, and rests upon an arm, $h$, pivoted at $i$. This arm is shown as resting upon a roll, $k$, at the upper end of the upper arm of a foot-lever, $l$, pivoted at $m$, and having extending from it a foot-piece, $n$. The lever $l$ is drawn back by the stress of a spring, $o$, and when drawn back, as shown in Fig. 4 by dotted lines, the roll or top of the lever is thrown down, so that the horn drops by gravity, as before explained, and as is shown in Fig. 4 by dotted lines, while, when the foot-piece $n$ is depressed by the operator, the upper arm of the lever is brought to a vertical position, as shown in full lines in Fig. 4. In this latter position said lever-arm and the shank-piece of the post are in the same vertical line, and the top of the horn is held in stationary position as to vertical movement. When the foot-piece $n$ is depressed by the operator it presses against the inclined end of a latch, $p$, forcing back such latch until the foot-piece passes beneath the plane of movement of the latch, which then springs forward over the foot-piece, and, by the stress of a suitable spring, thereby locking the horn and all the parts connected therewith in position as to vertical movement. When the operator wishes to release the horn, (his foot being upon the foot-piece $n$,) he presses the latch $p$ back with his foot until it passes the foot-piece $n$, the parts being then brought to position (as seen by dotted lines in Fig. 4) by the stress of the spring $o$. The horn rotates freely in the bearing $g$, as in the patents above referred to.

Extending from the plate $a$ are the housings, in which is journaled the driving-shaft $q$, and in the front part of this plate are the slides $r\ s$, to which are attached the nail-tube $t$ and presser-foot $u$. The presser-foot is actuated by mechanism above referred to, as shown in prior patents, and need not be described. The nail-tube slide is positioned vertically, as before described, and the ratchet-nut box $v$, upon extension $w$ of slide $r$, is jointed to the front arm of a rocker-lever, $x$, whose rear arm has a pin or roll extending from it into a cam-groove of a cam-wheel, $y$, on the main shaft $q$. The nail-tube being positioned vertically in accordance to the thickness of the material, as described, its reciprocating motion, which is constant, is produced by the action of the lever $x$, and through this reciprocating motion, and a point to which the nail-tube is moved before each nail is inserted, is insured the proper length of nail to be cut from the plate. Just above the nail-tube foot the slide $r$ is formed with a slot or chamber, $a^2$. In the front part of this chamber are pivoted two horizontal lever-arms, $b^2\ c^2$, for operating the cutters $r^2\ s^2$, and the nail-strip is projected into the chamber $a^2$ and between the cutters by a proper feeding mechanism. The nail strip or plate is carried in a strip box or trough, $d^2$, having a space or channel of the proper size, and the strip-box is arranged, with relation to the chamber $a^2$ and the cutters, so as to pass the end of the nail-strip directly between the cutters, and a nail severed from the strip by the cutters $s^2\ q^2$ is held in a space, $a^4$, just back of the cutting-edges, (see Fig. 8,) and in line with the path in which the nail-driver moves, and a nail so held is driven from the space $a^4$ by the driver directly into the sole, it passing through the nail-tube $t$, which is also in line with space $a^4$. This passage $a^4$, in which the nail is inclosed by the cutters, is made by removing a portion of the movable part of the cutter, just back of its cutting-edge, (see $c^2\ s^2$,) and also a portion of the metal back of the cutting-edge of $q^2$, the fixed cutter. This passage $a^4$ in the cutters serves as a nail-guide, and the passage is opened and closed for each nail cut and driven. The strip-box is supported at its rear on a pivot, $e^2$, and its forward end is pressed by a spring, $f^2$, against a stop, $j$, and the end of the strip-box is shown as projecting into the chamber $a^2$. Into a slot cut through one of the plates of the box enters the point of a spring feed-pawl, $g^2$, the point of this pawl pressing against the nail-plate or into the space between two of its ribs. This pawl is hung to one arm, $h^2$, of a vertical rocker-lever, $i^2$, pivoted at $k^2$, and having its upper arm or an adjustable pin, $l^2$, passing through the same, resting against a peripheral cam, $m^2$, the arm or pin being held against the cam by the stress of a spring, $n^2$, and the stress of the spring and the length of stroke of the pawl being regulated by a screw thread and nut used in connection with the spring, as shown in Fig. 4, or by any other suitable means. On the opposite side of the box is another spring-pawl, $o^2$, fastened to the box, as seen at $p^2$, the point of the pawl passing through the wall of the box and pressing against the nail-strip, serving as a detainer-pawl to prevent the strip from slipping back when the feed-pawl moves back. The end of the nail-plate is projected beyond the strip-box, and passes between the vertical cutting-edge of a stationary cutter, $q^2$, and the edges of two movable cutters, $r^2$ $s^2$. The edge of the stationary cutter $q^2$ is of a length equal to or in excess of the maximum width of the nail-plate to be used, and the length of cutting-edge of the two cutters $r^2$ $s^2$, taken together, is of a length equal to the edge of the stationary cutter, the path of movement of one of the movable cutters being above the path of movement of the other.

Both of the movable cutter-levers $b^2$ $c^2$ are pivoted at $t^2$, and the upper lever $b^2$ is jointed at its outer end to a slide, $u^2$, connected by a link, $v^2$, to the lower arm of a rocker-lever, $w^2$, from whose upper arm a pin or roll, $x^2$, extends into the groove of a cam-wheel, $y^2$, on the driving-shaft $q$, so that rotation of the driving-shaft imparts a reciprocating movement to the upper cutter-arm, to operate the upper movable cutter. The lower cutter-arm $c^2$ has extending up from its outer end a pin, $a^3$, which is struck by the other cutter-arm $b^2$ as the latter is moved inward to close the upper cutter, the pin being struck by the arm $b^2$ at the last part of the inward movement of the latter, or after the upper cutter has operated upon the nail-plate, and the arm $c^2$ is drawn back by a hook, $b^3$, extending from the arm $b^2$, as said arm $b^2$ moves outward, the inward movement of the arm $c^2$ actuating the lower cutter to sever a nail from the end of the nail-plate, and its outward movement drawing back or opening the lower cutter to enable the end of the nail-strip to pass between the cutters.

The stationary cutter is fixed to the nail-tube slide $r$, and directly behind the edge of said cutter is a part of the nail-tube $t$. The movable cutters are jointed to said tube-slide, and the front end of the strip-box extends into chamber $a^2$ of the slide, and at the time of operation of the cutters on the nail-strip rests on stop $j$, so that cutter $r^2$, which operates first, cuts more or less from the upper edge of the strip, accordingly as the nail-tube end, resting on thick or thin stock, leaves more or less of the upper edge of the nail-strip in the path of action of cutter $r^2$. The strip-box is made with a bottom piece near its front end, upon which the bottom of the nail-plate rests, a suitable foot or spring, $j^2$, pressing upon the upper edge of the strip to hold it down. The front end of the box is held down on stop $j$ by a spring, as before described, and projects into the chamber $a^2$ formed in the slides $r$ $s$, and when short nails are being used the bottom of the chamber $a^2$ does not meet and lift the strip-box. The surface of the chamber does, however, meet the strip-box when a long nail is being used, and the strip-box is lifted with the nail-tube and slides when the tube is raised to permit the stock to be moved or fed along the horn. As the nail-tube moves up, the cutters open, leaving the end of the nail-plate free to be projected between the cutters. As the strip-box moves down, (the cutters remaining open,) it is arrested by the stop $j$, and the nail-tube and cutters continue to move down until the tube rests on the stock to be nailed, and in this manner the height of the heading-cutter above the bottom of the nail-strip is automatically changed in accordance with the thickness of the stock. The heading-cutter operates to cut just enough from the top of the plate to leave a width of plate to be cut by the other cutter, equal to the length required for the nail. The piece cut from the top of the plate by the upper cutter is pushed forward by said upper cutter through a throat, $c^3$, said throat extending out through the front of the slide $r$, and the chips being ejected through said throat.

In the inner face of the cutter-arm $b^2$, and adjacent to the cutter, is a vertical groove, $d^3$, and as the cutter pushes forward the chip this vertical groove comes into position to form one wall of the bore of the nail-tube, the coincident movement of the lower cutter severing the nail, and bringing the nail cut by it into line with the nail-tube, the nail being then inclosed in passage $a^4$, and in position for the downward or driving action of the driver, as before described.

The arrangement of the nail-plate-box delivery end with respect to the bottom surface of the chamber $a^2$ in the peg-tube slide $r^4$ is as follows: The machine is of course made to receive between the face $e$ of the horn and the lower end of the peg-tube $t$ a given maximum thickness of sole, (say, for example, seven-eighths of an inch,) and to release the sole from pressure of the peg-tube end it is lifted beyond said position of seven-eighths of an inch above the surface $e$ a distance of, say, one-fourth of an inch. Now, although the strip-box is pivoted so that it may be lifted, to some extent, by the rise of the peg-tube slide, its arrangement is such that even when soles of maximum thickness are to be operated upon the end of the nail-plate box will be in its normal position, resting upon the stop $j$, when the nail-cutters operate to cut a nail from the strip.

The driver is fixed to the foot of a vertical rod, $e^3$, moving in suitable bearings. On its upper end is a sliding arm, $f^3$, connected, by links $g^3$, with one arm of a rocker-lever, $h^3$, whose other arm has extending from it a pin or roll, $i^3$, that enters a cam-groove, $k^3$, of a cam-wheel, $l^3$, on the driving-shaft $q$. The driver-rod $e^3$, by an intermediate connection, has a variable downward stroke, contingent upon the variable position of the nail-tube foot. For this purpose we employ a mechanism as follows: A piece, $m^3$, fixed on the rod $e^3$, has pivoted to each side of it a bell-crank lever, $n^3$, whose vertical arm is in vertical line with links $o^3$, pivoted at their upper ends to the arm $f^3$, sliding upon the driver-rod, the horizontal arm of each of the levers $n^3$ being operated upon by a suitable spring, $p^3$, to hold their other arms and links $o^3$ normally in vertical line with each other and with the links $g^3$. An arm, $q^3$, is fixed to the upper end of slide $r$, which is made tubular to receive the driver-rod $e^3$ in axial line with the nail-tube, through which the driver slides, this arm having an adjustable pin, $r^3$, which, being struck by a plate, $s^3$, connected with the bell-crank levers $n^3$, as the driver descends, throws the toggle-arms $o^3$ out of vertical line, and thereby limits the extent of descent of the driver.

As the position of the stop-pin $r^3$ is adjustably predetermined by the position of the nail-tube foot, the toggle joint made by levers $n^3$ and links $t^3$ is tripped, so as to bring the end of the driver exactly to the bottom of the nail-tube foot, or to the upper surface of the sole upon which said foot rests, or to any fixed position with relation thereto. This tripping mechanism, however, forms no part of the present invention.

It is desirable to have the nails, when driven, present an enlarged end on the surface of the sole for the appearance of the shoe and for the greater security of the work. We accomplish this by making the driver and the tube larger in section than the nail, and when the point of the nail strikes the horn, a portion of the upper end of the nail is still in the tube. After the clinching of the point the farther downward movement of the nail is stopped by the horn, and the metal at the upper end is expanded or upset to fill the tube by the continued downward motion of the driver, and thus the nail is headed. It is evident that this enlargement of the head of the nail may be done in the tube, or at any other place in the machine, by the use of similar means, though, for simplicity, we prefer doing it as herein described.

Two kinds of cutters are shown in Fig. 7. Those at the left have straight cutting-edges, as shown in Figs. 5 and 8, and those at the right have serrated cutting-edges. The lower end of the nail-driver is preferably notched or serrated to assist in heading the nail.

We claim—

1. In combination with a nail-tube and a nail-driving mechanism, a rotative work-supporting horn, adapted to be locked in a predetermined and fixed position for the action of the driving mechanism, and to be released from such position for its descent, substantially as shown and described.

2. The rotary horn $d$, horn-supporting arm $h$, foot-lever $n$, spring $o$, and spring-latch $p$, combined and arranged substantially as shown and described.

3. In combination with a work-supporting horn or arm, and suitable work-feeding and nail presenting and driving mechanism, a nail-plate holding, feeding, and presenting mechanism, and a nail-severing mechanism, which cuts nails in succession from the end of the nail-plate, and transfers each nail in succession to the nail-tube to be driven, substantially as shown and described.

4. In combination with the nail-box and nail-tube, cutters which automatically cut from the plate nails of varying lengths, substantially as described.

5. In combination with the nail-plate box, a feed-spring thrown backward by the cam $m^2$ and lever $i^2$, substantially as shown and described.

6. A nail-tube slide or carrier, $r$, provided with a slot or chamber, $a^2$, for the entrance of the nail-strip or strip-box, and adapted to receive and carry the cutters, substantially as described.

7. The combination, with a nail-strip-presenting mechanism, of nail-severing mechanisms, adapted to cut the edge of the strip for a nail of the proper length, and then cut the nail from the strip, substantially as described.

8. The stationary cutter $q^2$ and movable cutters $r^2$ $s^2$, operating to cut each nail to proper length, substantially as described.

9. In combination with the movable cutters, the ejector-throat $c^3$, substantially as described.

10. The cutter-arms $b^2$ $c^2$, arranged and operated substantially as shown and described.

11. The combination, in a nailing-machine, of a driver and a nail-receptacle having an enlarged chamber, whereby the driver forms a head upon the nail and drives it out of the chamber.

12. In a nailing-machine, the combination of mechanism for automatically governing the length of the nail with mechanism for forming a head on a nail after being severed from the strip, substantially as described.

13. The combination, with the cutters of a nailing-machine, adapted to cut metallic fastenings from a continuous ribbon of stock, of mechanism substantially to make a head upon the severed nail in opposition to the clinching-point.

In testimony whereof we have signed our names to this specification in the presence of two subscribing witnesses.

GORDON McKAY.
HADLEY P. FAIRFIELD.

Witnesses:
O. M. HOLMES,
E. K. BELCHER.